June 25, 1935.　　　O. G. MANDT　　　2,006,316
APPARATUS FOR BUILDING ROADS
Filed May 2, 1932
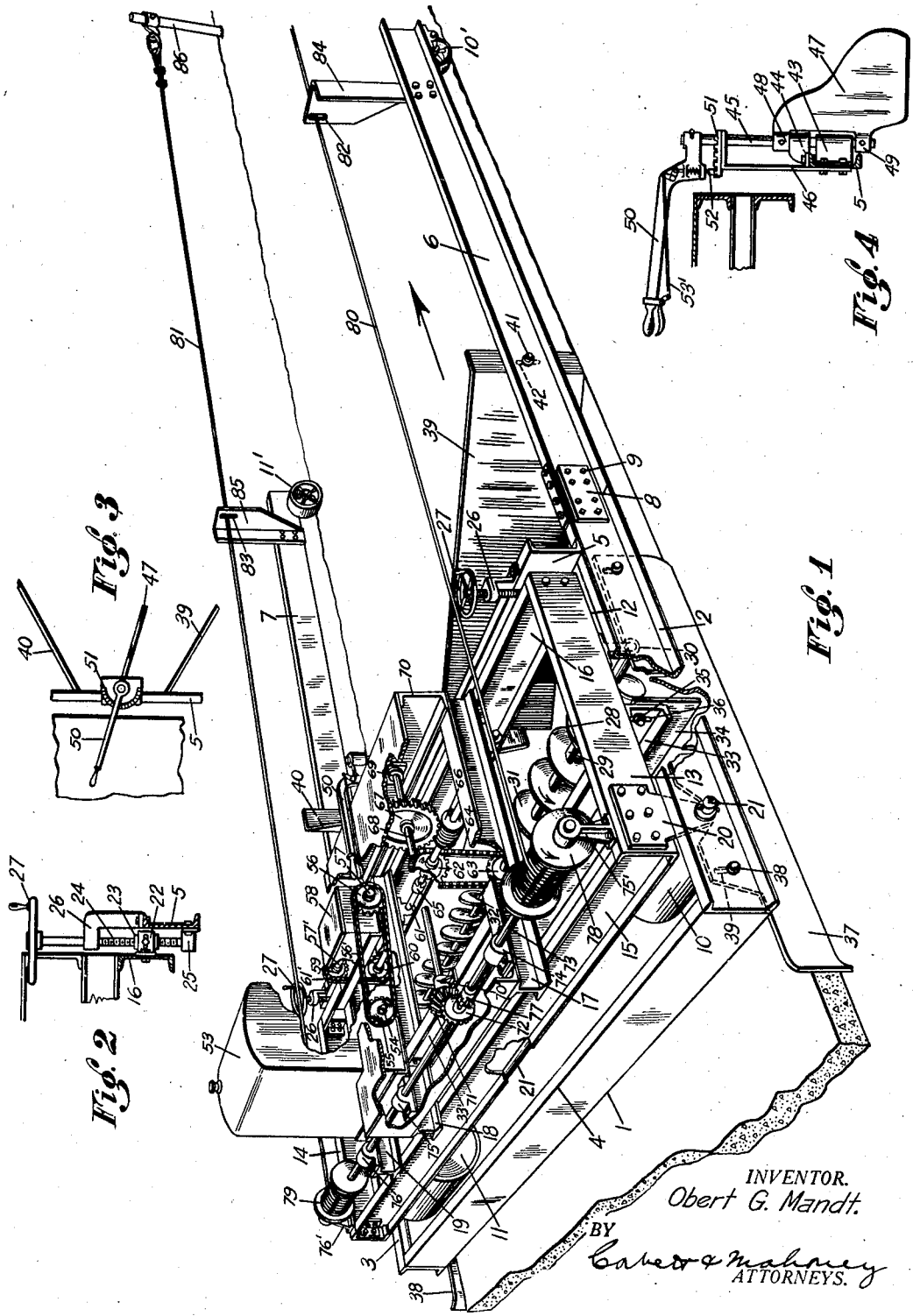
INVENTOR.
Obert G. Mandt.
BY
ATTORNEYS.

Patented June 25, 1935

2,006,316

UNITED STATES PATENT OFFICE 2,006,316

APPARATUS FOR BUILDING ROADS

Obert G. Mandt, Columbus, Ohio, assignor to The Jaeger Machine Company, Columbus, Ohio, a corporation of Ohio Application May 2, 1932, Serial No. 608,667

21 Claims. (Cl. 94—44)

My invention relates to an apparatus for building roads. It has to do, primarily, with an apparatus for spreading and compacting previously mixed concrete or other road building materials, and forming thereof, a slab or monolith of the desired section and contour.

One of the objects of my invention is to provide an apparatus that will produce an accurately formed and compacted monolith or slab, from previously mixed concrete placed in a continuous fill or windrow upon the road-bed.

Another object of my invention is to provide a machine of the class described which will move through the material with a maximum of ease and will simultaneously spread the material across the surface adapted to receive it.

Another object of my invention is to provide a machine of the class described that will produce an accurately formed slab or monolith without the use of side-forms or rails.

Another object of my invention is to provide a machine of the class described that will produce an accurately formed monolith or slab without the use of side-forms or rails, such monolith or slab being free from pockets, crevices, interstices, and other defects.

In its preferred form, my invention contemplates the provision of a machine which is designed to receive previously mixed concrete which is placed in continuous fill or windrow in front of the machine and through which the machine is adapted to pass. The machine is adapted to readily move through the material and to simultaneously spread the material and distribute it uniformly and compactly across the prepared road-bed or old road surface, to form a slab of the desired section and contour. Furthermore, this machine is of such a type that it will not be necessary to utilize side forms or rails, in the construction of the road.

More specifically, my invention preferably comprises a machine which consists of a main frame member having an adjustable spreader assembly mounted thereon. This spreader assembly preferably comprises a spiral spreading member having oppositely pitched sections which are adapted to spread the material from the center of the road to the right and left thereof across the road. Means is provided for guiding material to the inner ends of the sections of the spiral spreading member as the machine passes through the material and to regulate the proportionate amount of material delivered to the said sections. The spreader assembly further comprises a strike-off blade mounted in the rear of the spiral spreading member, which is adapted to strike off the material spread by the spiral spreading member and to shape it to the desired contour. This strike-off blade and the spiral spreading member are adjustable as a unit or the strike-off blade may be adjusted relative to the spiral spreading member.

Rollers are preferably mounted at the rear end of the machine and on each side thereof. These rollers are adapted to ride on the surface of the material which has been spread by the spreader assembly, and in conjunction with the spiral spreading member, serve to compact the material against the side forms or plates which are carried by the machine. Thus, after the machine moves on, and the side forms move therewith, the material will be compacted in such a manner that it will keep the shape imparted thereto by the machine. Means is also provided for propelling the machine through the material to be spread and for guiding the machine in a straight path so that a road having straight, uniform edges will be produced.

The preferred embodiment of my invention is shown in the accompanying drawing wherein similar characters of reference designate corresponding parts and wherein:

Figure 1 is a perspective view of an apparatus constructed in accordance with my invention.

Figure 2 is a detail of one of the members which may be used for adjusting that portion of the frame which carries the spiral spreading member and the strike-off blade.

Figure 3 is a plan view of a deflector blade which may be adjusted to govern the flow of material to each side of the road.

Figure 4 is a side elevation of the deflector blade shown in Figure 3.

With reference to the drawing, my invention is shown as comprising a main frame 1 which consists of the longitudinal beams 2 and 3. These beams 2 and 3 are secured together at their rear ends by means of a cross beam 4. The forward ends of these beams 2 and 3 are secured together by means of a cross beam 5 which is mounted on the upper edges thereof.

The forward ends of the beams 2 and 3 are removably bolted to beams 6 and 7 respectively, by means of plates 8 and bolts 9. The beams 6 and 7 extend forwardly a considerable distance from the body portion of the machine for a purpose to be hereinafter described. The forward ends of the beams 6 and 7 are mounted on wheels 10' and 11'. The rear end of the machine is supported on roller wheels 10 and 11 which are suitably mounted at the rear and to each side of the main frame 1.

An auxiliary frame 12 is mounted on the main frame 1. This auxiliary frame 12 comprises longitudinal channel members 13 and 14 which are joined together by means of cross members 15 and 16. Channel members 17, 18 and 19, are mounted at spaced intervals on the upper edges of the cross members 15 and 16.

The rear end of the auxiliary frame 12 is provided with depending supporting members 20 which have their lower ends rotatably mounted on the axle member 21 of the roller wheels 10 and 11. The forward end of the auxiliary frame 12 is adjustably connected to the main frame 1.

In Figure 2 I have shown a mechanism which I preferably use in adjusting the forward end of the auxiliary frame 12 with relation to the main frame 1. This mechanism comprises a bracket member 22 which is bolted to the face of the cross member 16. A nut 23 is trunnioned in the arms of the bracket member 22.

A threaded shaft 24 is adapted to pass through an opening in the nut 23 and the threads on the shaft are adapted to cooperate with threads formed on the inner surface of the nut 23. The shaft 24 has its lower end rotatably mounted in a bracket member 25 which is bolted to the inner surface of the cross beam 5. The upper end of the shaft 24 is rotatably mounted in the bracket member 26 which has its lower end bolted to the upper edge of the cross beam 5 and which extends upwardly therefrom. The shaft 24 is thus rotatably mounted in the bracket members 25 and 26 but is not vertically movable therein. A hand wheel 27 is keyed to the upper end of the shaft 24 and such shaft is adapted to be rotated thereby. As shown in Figure 1, I have provided an adjusting mechanism, of the type just described at each side of the machine for adjusting the auxiliary frame 12 vertically with relation to the main frame 1.

It will be understood that if it is desired to adjust the frame 12 with relation to the frame 1, it is merely necessary to rotate the hand wheels 27. This rotates the shafts 24 and the threads on these shafts will cooperate with the threads on the inner surface of the nut 23. This will cause a raising or lowering of the front end of the auxiliary frame 12, depending upon the direction of rotation of such hand wheels and the frame 12 will pivot about the axle 21. It is obvious that other forms of mechanism may be used for securing this adjustment.

A spreader 28 is mounted on the auxiliary frame 12 adjacent the forward end thereof. This spreader comprises a shaft 29 having its ends journaled in bracket members 30 which depend from each side of the auxiliary frame 12. The spreader 28 is composed of the oppositely pitched spiral conveyer sections 31 and 32. It will be obvious that when the spreader is rotated in the direction of the arrows, Figure 1, the conveyer section 32 will feed the material to one side of the road and the conveyer section 31 will feed the material towards the opposite side of the road.

A channel member 33 is mounted in depending relation to the auxiliary frame 12 directly behind the spreader member 28. A strike-off blade 34 is mounted on the channel member 33 by means of bolts 35 and slots 36 in such a manner that it is vertically adjustable.

I have also provided vertically adjustable side plates 37 and 38 which are disposed on opposite sides of the main frame 1. These side plates are mounted on the beams 2 and 3 by means of bolts 38 and slots 39 so that they are vertically adjustable. The side plates 37 extend from the forward part of the main frame 1 to a point in rear of the body portion of the machine. As will be later seen, these plates 37 and 38 are adapted to serve as side forms for the road.

Vertically adjustable wing plates 39 and 40 are mounted at the forward end of the machine and are adapted to guide the material to the center of the machine and back to the spreading member 28. The outer ends of these side plates are provided with bolts 41 which are mounted in slots 42 formed in the beams 6 and 7. The inner ends of these wing plates 39 and 40 are similarly mounted on the cross beam 5 of the main frame 1. As shown in Figure 3, an opening is provided between the inner ends of these wing plates 39 and 40. I have provided a deflector mechanism which is disposed midway between the inner ends of the wing plates 39 and 40 and which is adapted to govern the flow of material to either side of the roadway.

As shown in Figure 4, this deflector mechanism comprises bracket members 43 and 44 which are bolted to the cross member 5 and which are adapted to rotatably support the lower end of a shaft 45. The upper end of this shaft 45 is rotatably mounted in an upstanding bracket member 46 which is also bolted to the cross beam 5. A deflector blade 47 is mounted on the lower end of the shaft 45 by means of arms 48 and 49 which are provided with openings through which the shaft 45 passes and which are keyed thereto. The upper end of the shaft 45 is provided with a handle 50 which has one end keyed to such shaft. A rack 51 is mounted on the upper end of the bracket member 46. A pawl 52 mounted on the arm 50 is adapted to cooperate with this rack to hold the deflector blade 47 in any adjusted position. A leverage mechanism 53' is provided for operating the pawl and ratchet mechanism.

I have provided a power unit 53 which is of any suitable type and which is mounted on the channel members 18 and 19 on the auxiliary frame 12. This power unit may be of any desired type and is adapted to drive the spreader mechanism and also to propel the machine.

The drive shaft 54 of the power unit 53 is provided with a sprocket 55 keyed on the outer end thereof. This sprocket 55 is connected to a sprocket 56 by means of a sprocket chain 56'. Sprocket 56 is keyed on a shaft 57 of a gear reduction unit 58. A sprocket 59 is mounted at the opposite side of the gear reduction unit 58 and is keyed on a shaft 57'. The sprocket 59 is connected with sprocket 60 by means of a sprocket chain 61'. The sprocket 60 is keyed on a shaft 61 which is journaled in bearing members mounted on the undersurface of the channel members 17 and 18.

The shaft 61 is provided with a sprocket 62 which is loosely mounted thereon intermediate its ends. The sprocket 62 is connected to a sprocket 63, which is keyed on the shaft 29 of the spreader unit, by means of a sprocket chain 64. Thus rotation of the sprocket 62 causes rotation of the spreading member 28. A clutch member 65 is splined on shaft 61 and this clutch member may be operated by any suitable mechanism (not shown) to engage the sprocket 62 and to cause it to rotate with the shaft 61 or to be disengaged therefrom to allow the shaft 61 to rotate without rotating the sprocket 62. It will be obvious that by providing a mechanism of this type the spreader unit can be operated or can be rendered inoperative at any time desired.

The shaft 61 is further provided with a worm 66 which is keyed thereto. This worm 66 meshes with a worm gear 67 which is keyed to a shaft 68. The shaft 68 has one end journaled in a bearing 69 formed in a channel member 70 which is mounted on the channel members 17 and 18. The opposite end of the shaft 68 is rotatably mounted in a bearing member 70' mounted on a channel member 33' which is secured to channel members 17 and 18. This end of the shaft 68 is provided with a bevel gear 71 which is keyed thereto, and which meshes with a bevel gear 72 which is loosely mounted on a shaft 73. The shaft 73 is rotatably mounted in a bearing member 74 which is mounted on the channel member 17 and bearing members 75 and 76 which are mounted on channel members 18 and 19, respectively. The outer ends of shaft 73 are supported in supporting members 75' and 76' which are bolted to channel members 12 and 14, respectively. A clutch member 77 is splined to the shaft 73 and may be operated by any suitable mechanism (not shown), to clutch the bevel gear 72 or to be disengaged therefrom in order to rotate the shaft 73 only when desired.

The opposite ends of shaft 73 are provided with drum members 78 and 79 on which the cables 80 and 81 respectively are adapted to wind. These cables pass through slots 82 and 83 formed in cable guides 84 and 85 which are mounted on the outer ends of the beams 6 and 7, respectively. The outer free ends of the cables 80 and 81 are connected to stakes 86 which may be driven into the roadway a considerable distance ahead of the machine at the edges of the roadway.

It will be obvious that whenever the shaft 73 is rotated the drum members 78 and 79 will also be rotated and wind the cables 80 and 81 thereon. This will propel the machine along the road-way. By having the two drum members 78 and 79 rotating at the same rate of speed and by having the cable guides 84 and 85 mounted on the extreme outer ends of the beams 6 and 7, the machine will move forwardly in a straight line.

It will also be obvious that with the driving mechanism previously described, the spreader unit may be operated at any time desired or may be rendered inoperative whenever desired. This is also true of the propelling mechanism for the machine. Furthermore, the spreader unit may be rendered inoperative when the machine moves forward or the propeller mechanism may be rendered inoperative while the spreader unit is operating.

In the operation, my machine is placed on the road-way and the cables 80 and 81 are connected to stakes 86 which are driven in the roadway at the edges thereof, a considerable distance ahead of the machine. The spreader assembly comprising the strike-off blade 34 and the spreading unit 29 may be adjusted to the desired level, by adjusting the auxiliary frame 12, and the strike-off blade 34 may be adjusted relative to the spreading member 29 to any position desired. The thickness of the layer of material spread by my machine will be determined by the adjustment of the spreader assembly. The side plates 37 and 38 and the wing plates 39 and 40 are adjusted in accordance with the adjustment of the spreader assembly. The spreading unit is then operated and the propelling mechanism is operated to cause the machine to move forwardly.

In the initial movement of the machine the rollers 10 and 11 will be suspended, it being understood that the weight of the rear end of the machine will be supported on the side plates 37 and 38 which rest on the ground. However, the side plates may be so adjusted that as the machine progresses and the rollers ride up on the material which has been spread, the lower edges of the side plates will not contact with the ground but will be spaced a trifle therefrom so that the rollers 10 and 11 may exert a compressive force on the material, as will be later seen. The spacing of the lower edge of the side plates from the ground will not be sufficient to permit the escape of any appreciable amount of concrete.

As the machine moves forwardly the wing plates 39 and 40 will crowd the material of the windrow to the center of the machine. The deflector blade 47 may be adjusted from time to time in order to feed the proper amount of material to both sides of the road-bed. The material passes back between the wing plates 39 and 40. The spreader 28 will then contact with the material and the section 32 will feed the material towards one side of the road and the section 31 will feed the material towards the opposite side of the road. The material is not only automatically spread across the road surface by means of the spiral blade structures, but, being confined between the spreaders and the strike-off plate, is simultaneously subjected to a wiping and spading action and is forced downward which causes a compaction of such material. This action insures that the material is spread uniformly and compactly so that there will be no defects in the road.

It will be obvious that the material will also be forced towards the side plates 37 and 38 and will be compacted thereagainst. As the machine continues to move forward the strike-off blade acts upon the mixed concrete that has already been spread to give it a proper grade and crown. After the strike-off blade passes over the material the rollers 10 and 11 ride over the material and, since they support the greater portion of the weight of the machine, they will also exert a compacting force on the concrete and compact it against the side plates 37 and 38. The concrete will be compacted against the side plates to such a degree that after the machine moves forward and the side plates move with it no other forms will be necessary in order to keep the road in its proper shape.

It will be obvious that the rollers 10 and 11 always ride on the surface which has been produced by the machine and that the greater portion of the weight of the machine is supported thereon. The wheels 10' and 11' support the forward end of the machine and they ride on the graded road-bed or the old road surface which is being covered. Since these wheels are mounted on the extreme outer ends of the beams 6 and 7 which extend a considerable distance ahead of the machine, any irregularity in the graded surface will be minimized to such an extent as to be practically imperceptible in the finished road surface. Furthermore, since the cable guides are mounted on the extreme outer ends of the beams 6 and 7 the machine will be accurately steered in a straight line.

It will be obvious from the above description that I have provided a machine which will produce an accurately formed and compacted slab or monolith from previously mixed concrete placed in a continuous pile or windrow upon the road-bed without the use of side forms or rails.

Furthermore, it will be obvious that my machine spreads the concrete uniformly across the entire road surface without leaving any cracks, crevices or interstices therein. It will also be obvious that my machine may be adjusted to produce a road of any desired thickness. Furthermore, it will be apparent that the strike-off blade may be changed so that a road of any desired crown and grade may be produced.

It will be understood that although I have described my machine as being used for producing a concrete road, it may be used for producing roads which are composed of various other materials.

Having thus described my invention, what I claim is:

1. Apparatus for building roads comprising a spiral spreading unit adapted to spread the material of a windrow across the entire width of the roadway, side forms for precluding the lateral escape of the material being spread, wing plates for directing the material of said windrow to said spiral spreading unit, said spiral spreading unit being adapted to compact the material against said side forms, and rollers adapted to operate on the surface of the material which has been spread and to further compact such material against said side forms.

2. Apparatus for building roads comprising a spiral spreading unit adapted to spread the material from the center of the roadway to each side thereof, side forms for precluding the lateral escape of the material being spread, wing plates for causing the material to be fed to the center of said spiral spreading unit, an adjustable deflector member mounted between said wing plates for governing the amount of material flowing to either side of the road, said spiral spreading unit being adapted to compact the material against said side forms, and rollers adapted to operate on the surface of the material which has been spread and to further compact such material against said side forms.

3. Apparatus for building roads comprising a spiral spreading unit adapted to spread the material from the center of the roadway to each side thereof, adjustable side forms carried by said apparatus for precluding the lateral escape of material being spread, adjustable wing plates for crowding the material to the center of said spreading unit as the apparatus progresses through such material, an adjustable deflector for governing the amount of material supplied to each side of the roadway, said spiral spreading unit being adapted to compact the material against said side forms, a strike-off blade mounted directly behind said spiral spreading unit, said spreading unit and said strike-off blade being adjustable simultaneously or relative to each other, and rollers adapted to operate on the surface of the material which has been spread and to further compact such material against said side forms.

4. A machine of the type described for spreading material which is disposed in front thereof, comprising means for moving said machine through the material, a spreading member for spreading the material across a surface adapted to receive it, said spreading member comprising oppositely pitched screw spreading sections wing plates carried by said machine and adapted to guide the material to the adjacent ends of said oppositely pitched screw spreading sections as the machine moves therethrough, and means for governing the proportionate amount of material delivered to said oppositely pitched screw spreading sections.

5. A machine of the type described for spreading material which is disposed in front thereof, comprising means for moving said machine through the material, a screw spreading member for spreading the material laterally across a surface adapted to receive it, said screw spreading member comprising oppositely pitched screw spreading sections, means carried by said machine for guiding the material to the adjacent ends of said oppositely pitched screw spreading sections as the machine moves therethrough, means for governing the proportionate amount of material delivered to said oppositely pitched screw spreading sections, and side forms carried by said machine for limiting lateral displacement of the material spread by said screw spreading member.

6. A machine of the type described for spreading material which is disposed in front thereof, comprising means for moving said machine through the material, a screw spreading member adapted to spread the material laterally across a surface adapted to receive it, said spreading member comprising oppositely pitched screw sections, means for spreading the material to the adjacent ends of said screw spreading sections as the machine moves therethrough, means for governing the proportionate amount of material directed to said screw spreading sections, a strike-off blade, means for vertically adjusting said strike-off blade and said spreading member, and side forms carried by said machine and adapted to limit lateral displacement of material spread by said spreading member.

7. A machine of the type described for forming a monolith or slab from material which is disposed in front thereof, comprising means for propelling said machine through the material, means for rendering said propelling means operative or inoperative, said machine being supported on forward members which operate on the surface to be covered and rear members which operate on the surface produced by the machine, a screw spreading member carried by said machine and comprising oppositely pitched screw spreading sections, a strike-off blade carried by said machine, means for vertically adjusting said screw spreading member and said strike-off blade simultaneously, means for vertically adjusting said screw spreading member and said strike-off blade relative to each other, wing plates disposed ahead of said screw spreading member for guiding the material to the adjacent ends of said oppositely pitched screw spreading sections as the machine moves therethrough, said wing plates being independently vertically adjustable, adjustable means for governing the proportionate amount of material delivered to said screw spreading sections, side forms carried by said machine for limiting lateral displacement of the material spread by said screw spreading member and extending a considerable distance ahead of and behind said screw spreading member and being independently vertically adjustable, means for driving said screw spreading member to cause the sections thereof to spread the material in opposite directions and to compact it against said side forms, said driving means being independent of said machine propelling means, and means for rendering said driving means operative or inoperative.

8. A machine of the type described for forming a monolith or slab from material which is disposed in front thereof, comprising means for propelling said machine through the material, a screw spreading member carried by said machine and comprising oppositely pitched screw spreading sections, a strike-off blade carried by said machine, means for vertically adjusting said screw spreading member and said strike-off blade simultaneously, means for vertically adjusting said screw spreading member and said strike-off blade relative to each other, wing plates disposed ahead of said screw spreading member for guiding the material to the adjacent ends of said oppositely pitched screw spreading sections as the machine moves therethrough, said wing plates being vertically adjustable, adjustable means for governing the proportionate amount of material delivered to said screw spreading sections, side forms carried by said machine for limiting lateral displacement of the material spread by said screw spreading member, said side forms extending a considerable distance ahead of and behind said screw spreading member and being vertically adjustable, and means for driving said screw spreading member to cause the sections thereof to spread the material in opposite directions and to compact it against said side forms.

9. A machine of the type described for forming a monolith or slab from material which is disposed in front thereof, comprising means for propelling said machine through the material, a screw spreading member carried by said machine and comprising oppositely pitched screw spreading sections, a strike-off blade carried by said machine, means for vertically adjusting said screw spreading member and said strike-off blade simultaneously, means for vertically adjusting said screw spreading member and said strike-off blade relative to each other, means for guiding the material to the adjacent ends of said oppositely pitched screw spreading sections as the machine moves therethrough, side forms carried by said machine for limiting lateral displacement of the material spread by said screw spreading member, said side forms extending a considerable distance ahead of and behind said screw spreading member, and means for driving said screw spreading member to cause the sections thereof to spread the material in opposite directions and to compact it against said side forms.

10. A machine of the type described for forming a monolith or slab from material which is disposed in front thereof, comprising means for propelling said machine through the material, a screw spreading member carried by said machine for spreading the material across the surface to be covered, means for driving said screw spreading member, a strike-off blade carried by said machine, means for vertically adjusting said screw spreading member and said strike-off blade simultaneously, means for vertically adjusting said screw spreading member and said strike-off blade relative to each other, means for guiding the material to said screw spreading member as the machine moves therethrough, side forms carried by said machine for limiting lateral displacement of the material spread by said screw spreading member, said side forms extending a considerable distance ahead of and behind said screw spreading member.

11. A machine of the type described for forming a monolith or slab from material which is disposed in front thereof, comprising means for propelling said machine through the material, a screw spreading member carried by said machine and comprising oppositely pitched screw spreading sections, means for vertically adjusting said screw spreading member, vertically adjustable wing plates for guiding the material to the adjacent ends of said oppositely pitched screw spreading sections as the machine moves therethrough, adjustable means for governing the proportionate amount of material delivered to said sections, side forms carried by said machine for limiting lateral displacement of the material spread by said screw spreading member, said side forms extending a considerable distance ahead of and behind said screw spreading member and being vertically adjustable, and means for driving said screw spreading member to cause the sections thereof to spread the material in opposite directions and against said side forms.

12. A machine of the type described for forming a monolith or slab from material which is disposed in front thereof, comprising means for propelling said machine through the material, a screw spreading member carried by said machine, means for guiding the material to said screw spreading member as the machine moves therethrough, means for driving said screw spreading member to cause it to spread the material across the surface to be covered, means for vertically adjusting said screw spreading member, adjustable means for governing the proportionate amount of material fed towards each side edge of the surface to be covered, side forms carried by said machine for limiting lateral displacement of the material spread by said screw spreading member, said side forms extending a considerable distance ahead of and behind said screw spreading member and being the only members which shape the edges of said slab.

13. A machine of the type described for forming a monolith or slab from material which is disposed in front thereof, comprising means for propelling said machine through the material, a screw spreading member carried by said machine, means for guiding the material to said screw spreading member as the machine moves therethrough, means for driving said screw spreading member to cause it to spread the material across the surface to be covered, means for vertically adjusting said screw spreading member, side forms carried by said machine for limiting lateral displacement of the material spread by said screw spreading member, said side forms extending a considerable distance ahead of and behind said screw spreading member and being the only members which shape the edges of said slab.

14. A machine of the type described for forming a monolith or slab from material which is disposed in front thereof, comprising means for propelling the machine through the material, said machine having supporting members at its rear end which operate on the surface produced by the machine, a screw spreading member carried by said machine and disposed forwardly of said rear supporting members, said screw spreading member comprising oppositely pitched screw spreading sections, a strike-off blade carried by said machine in cooperative relation with said screw spreading member, means for vertically adjusting said screw spreading member and said strike-off blade simultaneously, means for vertically adjusting said screw spreading member and said strike-off blade relative to each other, means for guiding the material to the adjacent ends of said oppositely pitched sections as the machine moves therethrough, side forms carried by said machine for limiting lateral displacement of the material spread by said screw spreading member, said side forms extending a considerable distance ahead of and behind said screw spreading member and alongside of said rear supporting members, means for driving said screw spreading member to cause the sections thereof to spread the material in opposite directions and to compact it against said side forms, said rear supporting members being so disposed that as they operate on said surface produced by said machine they will further compact said material against said side forms.

15. A machine of the type described for forming a monolith or slab from material which is disposed in front thereof, comprising means for propelling the machine through the material, said machine having supporting members which operate on the surface produced by the machine, a screw spreading member carried by said machine for spreading the material across the surface to be covered and disposed forwardly of said supporting members, means for guiding the material to said screw spreading member as the machine moves therethrough, side forms carried by said machine for limiting lateral displacement of the material spread by said screw spreading member, said side forms extending a considerable distance ahead of and alongside of said supporting members, means for driving said screw spreading member to cause it to spread said material across the surface to be covered and in contact with said side forms, said supporting members being so disposed that as they operate on said surface produced by said machine they will further compact said material against said side forms.

16. A machine of the type described for spreading material which is disposed in front thereof, comprising means for propelling said machine through the material, a main frame member, a sub-frame member having its rear end pivotally connected to said main frame member, means for vertically adjusting the forward end of said subframe member, a screw spreading member carried by said sub-frame member, and comprising oppositely pitched screw spreading sections, a strike-off blade carried by said subframe member, means for vertically adjusting said strike-off blade on said sub-frame, means carried by said main frame ahead of said screw spreading member for guiding the material to the adjacent ends of said screw spreading member as the machine moves therethrough, means for driving said screw spreading member, and side forms carried by said main frame member adjacent the ends of said screw spreading member.

17. A machine of the type described for spreading material which is disposed in front thereof, comprising means for propelling said machine through the material, a main frame member, a sub-frame member having its rear end pivotally connected to said main frame member, means for vertically adjusting the forward end of said subframe member, a screw spreading member carried by said sub-frame member, and comprising oppositely pitched screw spreading sections, a strike-off blade carried by said sub-frame member, means for vertically adjusting said strike-off blade on said sub-frame, means carried by said main frame ahead of said screw spreading member for guiding the material to the adjacent ends of said screw spreading member as the machine moves therethrough, and means for driving said screw spreading member.

18. In a machine of the type described, a main frame member, a pair of arm members extending forwardly of said main frame member a considerable distance, an upstanding guide member disposed adjacent the forward end of each of said arm members, each of said guide members having an opening through which a cable is adapted to pass, a drum member mounted on said machine at each side thereof and in substantial alignment with the said guide member disposed on the corresponding side of said machine, said drum members being substantially in alignment with each other, a cable anchored to each of said drum members and passing out through the corresponding guide member, each of said cables being anchored at a point which is a considerable distance ahead of said machine, and means for rotating said drum members at the same rate of speed to cause said cables to wind thereon and to draw the machine forwardly towards the points where said cables are anchored.

19. A machine for forming a monolith or slab from material without setting side forms along the edges thereof comprising a frame member carrying traction devices, a screw-spreading member carried by said frame and comprising oppositely pitched screw-spreading sections, a member disposed behind said screw-spreading member for leveling material spread by said screw-spreading member, said last-named member being vertically adjustable, side forms carried by said machine for limiting lateral displacement of the material spread by said screw-spreading member, said side forms extending alongside of the ends of said screw-spreading member and a considerable distance ahead of and behind it, and means for driving said screw-spreading member to feed material laterally toward said side forms which shape the edges of the slab or monolith produced by the machine.

20. A machine for forming a monolith or slab from material without setting side forms along the edges thereof comprising a frame member, a screw-spreading member carried by said frame member and adapted to feed material laterally of the machine, a member disposed behind said screw-spreading member for leveling material spread by said screw-spreading member, side forms carried by said machine for limiting lateral displacement of the material spread by said screw-spreading member, said side forms extending alongside of the ends of said screw-spreading member and a considerable distance ahead of and behind it, and means for driving said screw-spreading member to feed material laterally towards said side forms which shape the edges of the slab or monolith produced by the machine.

21. A machine for forming a monolith or slab from material without setting side forms along the edges thereof comprising a frame member, a spreading member carried by said frame member and adapted to feed material laterally of the machine, a member disposed behind said spreading member for leveling material spread by said spreading member, said member being vertically adjustable, side forms carried by said machine for limiting lateral displacement of the material spread by said spreading member, said side forms extending alongside of and a considerable distance ahead of and behind said spreading member, said side forms being vertically movable relative to said spreading member and being adapted to shape the edges of the layer of material produced by the machine.

OBERT G. MANDT.